United States Patent [19]
Robbins

[11] Patent Number: 4,509,211
[45] Date of Patent: Apr. 2, 1985

[54] INFRARED EXTENSION SYSTEM

[75] Inventor: Michael S. Robbins, Los Angeles, Calif.

[73] Assignee: Xantech Corporation, Sylmar, Calif.

[21] Appl. No.: 494,807

[22] Filed: May 16, 1983

[51] Int. Cl.³ .............................................. H04N 5/44
[52] U.S. Cl. .................................... 455/603; 455/602; 358/194.1
[58] Field of Search ........................ 455/601, 602, 603

[56] References Cited
U.S. PATENT DOCUMENTS

| 4,367,548 | 1/1983 | Cotten, Jr. et al. | 370/3 |
| 4,394,691 | 7/1983 | Amano et al. | 455/603 |
| 4,420,841 | 12/1983 | Dudash | 455/602 |

FOREIGN PATENT DOCUMENTS 55-133153 10/1980 Japan .................................. 455/603

Primary Examiner—Robert L. Griffin
Assistant Examiner—Timothy K. Greer
Attorney, Agent, or Firm—Flam & Flam

[57] ABSTRACT

A pair of transducer units and a transmission line extend the operational range of an infrared remote control device that normally operates electrical or electromechanical apparatus such as a television channel selector. One transducer converts electrical signals into an infrared radiation pattern and is located adjacent the apparatus. The other transducer is located at any desired remote location linked by wire to the first transducer, and converts into electrical signals the infrared radiation pattern produced by the infrared remote control device. The first transducer includes an emitter in the form of an infrared light emitting diode, and the second transducer includes a sensor in the form of a photo diode. In certain applications, the transducers utilize the existing television cable.

2 Claims, 6 Drawing Figures

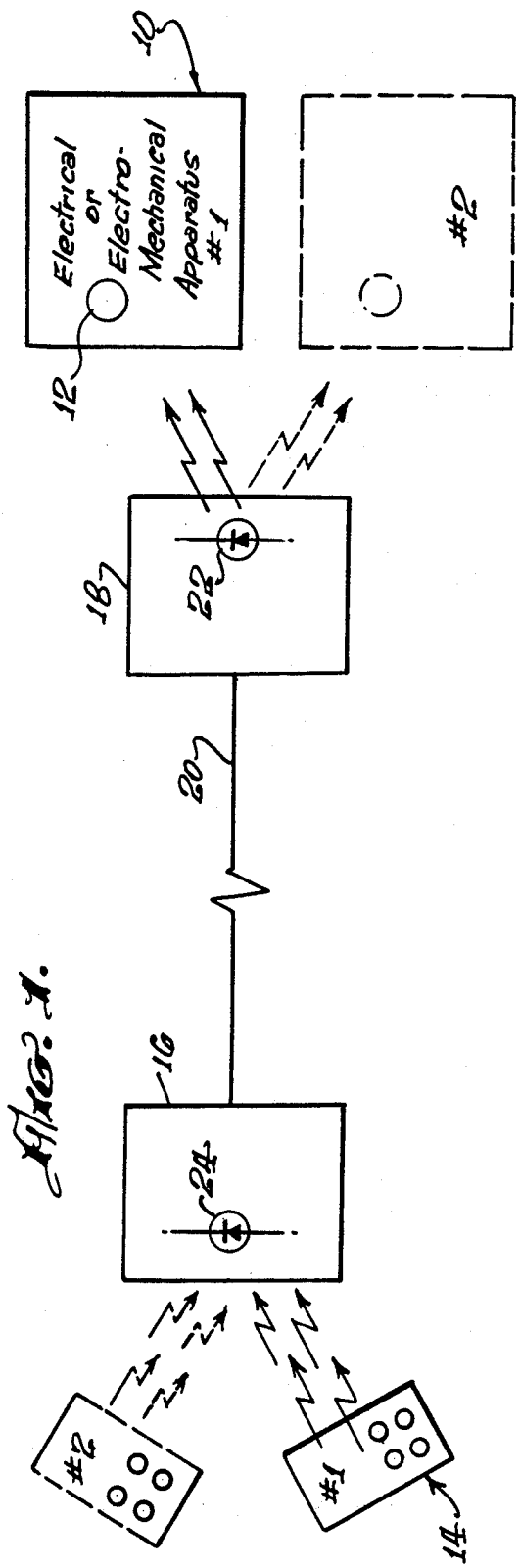
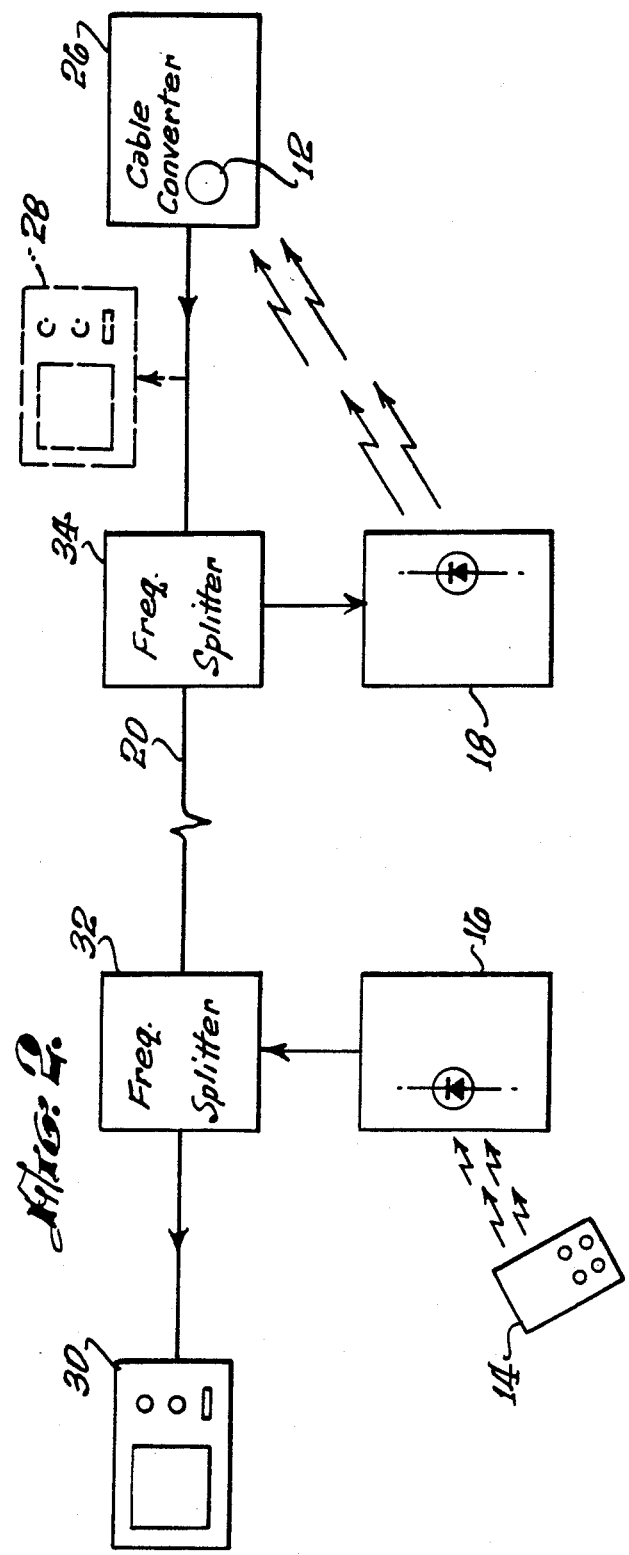

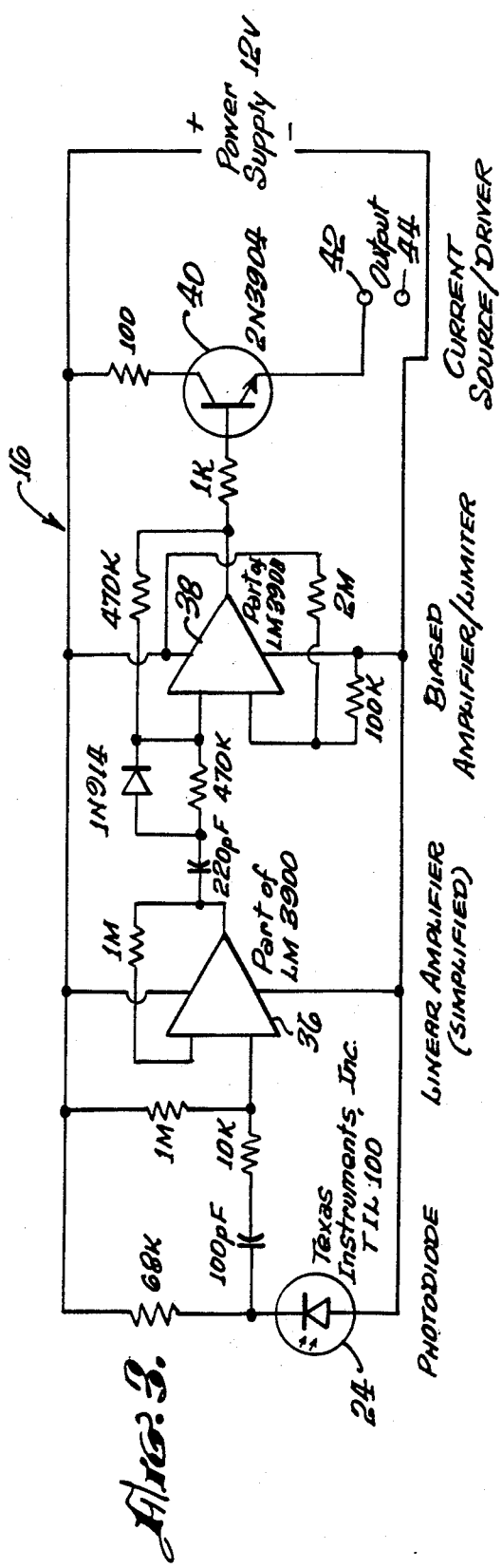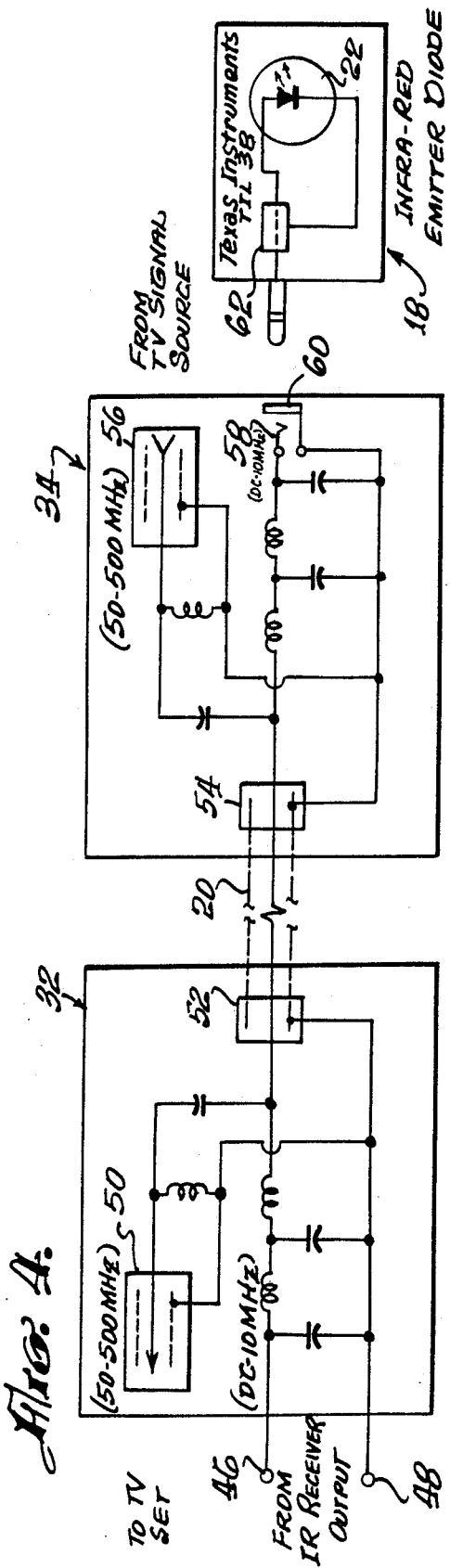

INFRARED EXTENSION SYSTEM

FIELD OF INVENTION

This invention relates to electrical and electromechanical systems that utilize a wireless infrared radiation link such as for remote control, data communication or the like. More particularly, this invention relates to apparatus for extending the operational range of the infrared link itself.

BACKGROUND OF THE INVENTION

Electrical and electromechanical systems that utilize an infrared link are generally dependent upon a line of sight path between the infrared transmitter and the infrared receiver. In many instances, an extension of the operational range is desirable. For example, a cable television system with monitors in different rooms may utilize the signal from a common selector unit. The selector unit includes an infrared receiver for operating it. Obviously, it is often desirable to operate the selector unit from either room, but the selector with its infrared receiver is in one room, not the other, and consequently, out of range should the remote control unit including its infrared transmitter be taken to the other room. No practical solution is known. Of course, each monitor could be provided with its own selector unit, but this obviously is expensive.

SUMMARY OF INVENTION

The primary object of the present invention is to provide a practical and versatile means for extending the operational range of an infrared link in a communication or data transmission system. For this purpose, I provide an infrared detector or sensor for the remote station, a transmission line, and an emitter located within the range of the main infrared receiver. The detector or sensor responds to infrared radiation of the remote control transmitter unit and converts its intelligence to a corresponding electrical signal. The transmission line sends the intelligence in electrical signal form to the emitter which is positioned within range of the infrared receiver. The emitter recreates the radiation pattern of the remote transmitter for operation of the receiver, as if the remote control transmitter unit were close by.

In the special case of a multi-unit television system, the cable wire itself can be used as the transmission line. Optionally, power lines, telephone lines or other existing conductor systems can be used, providing the various signals do not interfere, or providing isolation means are provided. Of course, a dedicated conductor pair can always be provided.

The remote control transmitter unit used is the self same remote control unit supplied with the apparatus. If, in addition to a television selector, the system includes a video tape apparatus cooperable with its own infrared remote control unit, both apparatus can be located adjacent each other within the range of the emitter. Both remote control units, one for the television channel selector, and one for the video cassette recorder, can be taken to the remote room and operated by the same extension link. The form of the signal generated by the respective remote control transmitter unit, whatever it may be, is recreated adjacent the corresponding receiver.

BRIEF DESCRIPTION OF THE DRAWINGS

A detailed description of the invention will be made with reference to the accompanying drawings wherein like numerals designate corresponding parts in the several figures.

FIG. 1 is a diagrammatic view illustrating the fundamental components of the system incorporating the present invention.

FIG. 2 is a diagrammatic view illustrating the system used in conjunction with a multiple unit television receiver system.

FIG. 3 is a simplified schematic diagram of a detector circuit.

FIG. 4 is a schematic diagram of a frequency splitter for use with the system of FIG. 2.

DETAILED DESCRIPTION OF THE PREFERRED EMBODIMENT

Figure 5:
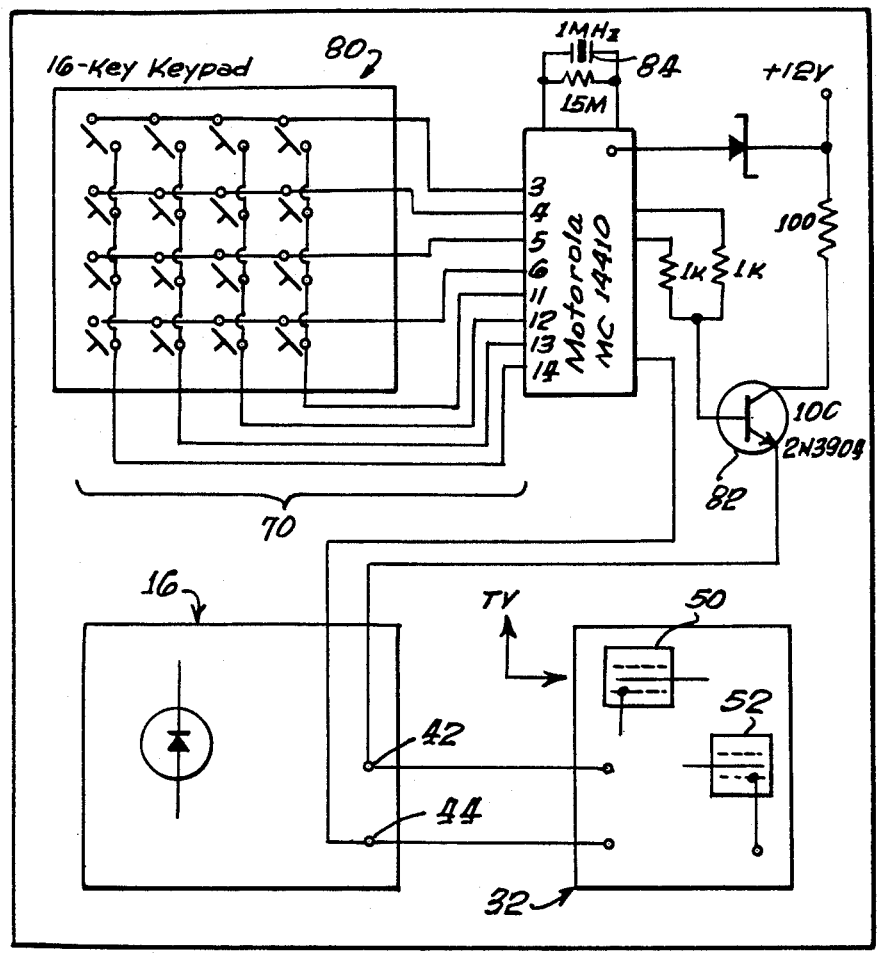
FIGS. 5 and 6 are companion schematic diagrams showing the system used in conjunction with a telephone type code system for control of auxiliary equipment.

The following detailed description is of the best presently contemplated modes of carrying out the invention. This description is not to be taken in a limiting sense, but is made merely for purposes of illustrating the general principles of the invention, since the scope of the invention is best defined by the appended claims.

Structural and operational characteristics attributed to forms of the invention first described, shall also be attributed to forms later described, unless such characteristics are obviously inapplicable or unless specific exception is made.

In FIG. 1 there is illustrated an electrical or electromechanical apparatus 10, such as a television cable converter, a laser disk player, a sound system or the like. The apparatus has an infrared receiver 12 that normally cooperates with a remote control infrared transmitter 14. However, the transmitter 14 has been taken to a location beyond the reception range of the receiver 12.

Notwithstanding the removal of the transmitter 14 to a place beyond the reception range of the receiver 12, the transmitter 14 is made operational by the aid of companion transducer or repeater units 16 and 18 connected by a transmission line 20. The repeater unit 18 includes an infrared emitter 22 located within the range of the receiver 12. The emitter 22 recreates the infrared radiation pattern of the remote control transmitter.

For this purpose, the repeater unit 16 is located at the place where the remote control transmitter 14 is to be operated. The unit 16 includes a detector or sensor 24 and suitable amplifier and transducer components for converting the radiation pattern to equivalent electrical signal form. The electrical signal so created by the repeater unit 16 directly excites the emitter 22, which converts the electrical signal into the same infrared radiation pattern produced by the remote control transmitter 14. The electrical or electromechanical device 10 accordingly responds as if the remote control transmitter 14 were close by and in range.

The system thus described comprises three elements, companion transducer units 16 and 18, and the transmission line 20. This system accommodates any breed of remote control transmitter, whatever may be the form of its intelligence—digitally coded pulse trains, discrete frequencies, or otherwise. Moreover, the system accommodates a plurality of electrical or electromechanical apparatus, each with its own breed of remote control infrared transmitter and as depicted in phantom lines in FIG. 1.

In FIG. 2, the electrical or electromechanical apparatus controlled is, by way of example, a cable converter 26 for a household television system. The converter 26 is located in a general living area for operation of a nearby television set or monitor 28 and for operation of a remotely located television set or monitor 30. The repeater system comprising companion units 16 and 18, and a transmission line are provided as in FIG. 1; however, the transmission line 20, in this instance, conveniently is the very coaxial cable that normally interconnects the apparatus 26 to the remotely located television set or monitor 30.

Of course, a separate dedicated conductor pair could be utilized instead of the coaxial cable 20. If however, the coaxial cable 20 is used, some isolation means must be provided to ensure that the infrared signals and the television signals do not interfere. For this purpose, frequency splitters 32 and 34 are provided at opposite ends of the coaxial cable 20. The splitter 32 allows unrestricted passage of electrical signals in the television frequency band, say 50 to 500 MHz from the cable 20 to the television set or monitor 30, while blocking lower frequency signals impressed on the cable 20 by the transducer unit 16. The splitter 32 allows unrestricted passage to the coaxial cable 20 of electrical signals generated by the transducer unit 16. Well known remote control infrared transmitters operate in bands below 10 MHz. Hence, appropriate isolation is provided at the remote location. The frequency splitter 34 at the other end operates in the same manner to achieve isolation.

The details of the repeater unit 16 are shown in FIG. 3 and the details of the frequency splitters 32 and 34, as well as the repeater unit 18, are shown in FIG. 4.

The repeater unit 16 shown in FIG. 3 includes a detector or sensor 24 which may take a variety of configurations. A photo detector such as a photo diode is shown which may be Part No. TIL 100 of Texas Instruments Company. The photo diode produces a signal corresponding to the intelligence of the infrared transmitter. For this purpose, a suitable load circuit is provided. Two stages of amplification are provided by companion elements of a quad amplifier, such as of National Semiconductor Company's Part No. LM3900. A driver transistor cooperates to produce an output between output terminals 42 and 44. Conventional components are labelled in FIG. 3.

Output terminals 42 and 44 connect with input terminals 46 and 48 (FIG. 4) of the frequency splitter 32. As shown in FIG. 4, the divider or splitter 32 includes conventional capacitive and inductive circuit elements to accomplish a frequency split in a known manner. The splitter 32 provides a coaxial cable connector 50 of any suitable form for connection to the television set or monitor at the remote location, and a jack or connector 52 for connection to the transmission line 20 which, in this case, is a coaxial cable.

The divider or splitter 34 at the other end also includes conventional capacitive and inductive circuit elements to accomplish the desired frequency split. It includes a coaxial cable connector 54, and a jack or connector 56 for cooperation with the television signal source, which in the form of FIG. 2 is a cable converter 26.

The frequency splitter 34 provides output terminals 58 and 60 depicted as a jack for cooperation with a plug 62 that places the emitter 22 directly across the output terminals 58,60. The emitter may be incorporated in a small case or attached to a bracket or clip for location adjacent the receiver 12 of the companion apparatus. The emitter 22 may be any suitable device that faithfully recreates infrared radiations in accordance with its excitation. In the present instance, an infrared light emitting diode, Part No. TIL 38 of Texas Instruments Company is quite suitable.

DETAILED DESCRIPTION OF SECOND EMBODIMENT

Not only can the system incorporating the transmission line 20 and infrared repeater units 16 and 18 operate in conjunction with various infrared remote control devices, but it can simultaneously accommodate hardwired remote control devices. In FIG. 5 there is depicted a telephone-type tone code generator 70 packaged with the transducer unit 16. The output of the tone code generator is applied directly to the output terminals 42 and 44 of the repeater unit 16 for transmission to the home station via the frequency splitter 32, also packaged with the transducer unit 16 and generator 70.

At the home station, a decoder 72 is packaged with the frequency splitter 34. The decoder 72 operates suitable switching devices, as by the aid of flip flop 74 and relay coils 76. By means of the tone code generator 70 and decoder 72, single or multiple functions of various apparatus are performed. For example, the decoder can determine operations of a cable converter, a laser disk player, a video cassette recorder, etc., and can direct their outputs to desired channels. The tone code generator 70 and the companion decoder 72 operate well within the band defined by the splitters 32 and 34.

Figure 6:
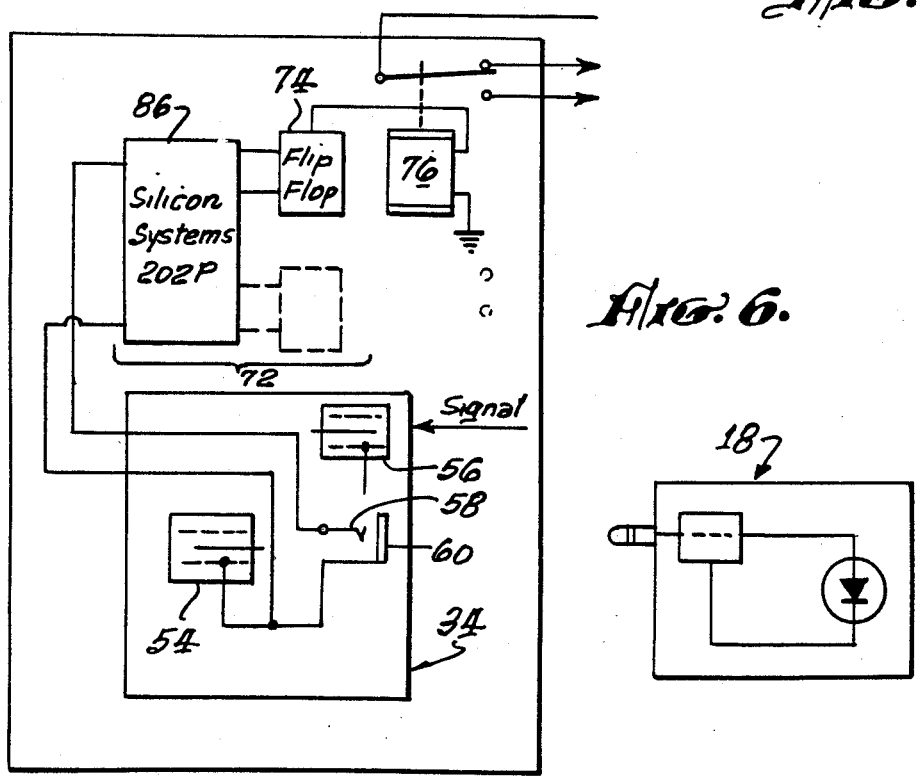

The tone code generator 70 includes a conventional key pad 80 that operates with a crystal controlled oscillator circuit utilizing, for example, a Motorola integrated circuit part No. MC14410. The generator also includes a suitable driver transistor 82, a crystal 84, and other components arranged in a manner well known to those skilled in the art. The decoder 72 (FIG. 6) includes a demodulator or detector circuit 86 utilizing, for example, integrated circuit part No. 292P of Silicon Systems, Inc.

Intending to claim all novel, useful and unobvious features shown or described, I make the following claims:

1. In a television viewing system at one area of which there is a television receiver, and at a second area of which there is programmable apparatus for transmitting signals to said television receiver through a transmission line extending between said areas, said programmable apparatus having a light receiver ordinarily cooperable with a portable light transmitter for determining parameters of said apparatus, said portable light transmitter when in said first area, being beyond the range of said light receiver, the combination therewith of:
   (a) a first transducer unit including a light emitter and located at said second area within the range of said receiver for converting electrical impulses into light radiation;
   (b) means connecting said first transducer unit to said transmission line;
   (c) a second transducer unit including a light sensor and located at said first area for converting light radiation into electrical signals;
   (d) means connecting said second transducer unit to said transmission line for actuation of said first transducer unit whereby operation of said portable light transmitter at said one area is operative to control the programmable apparatus;

(e) and circuit means for isolating the intelligence of said transducers from said television receiver and from said programmable apparatus.

2. The multi-area television viewing system as set forth in claim 1 in which said isolating circuit means comprises a first frequency splitter interposed between said transmission line and said first transducer unit, and a second frequency splitter interposed between said second transducer unit and said transmission line.

* * * * *